United States Patent [19]
Bishop

[11] 3,753,378
[45] Aug. 21, 1973

[54] RACK AND PINION VARIABLE RATIO STEERING GEAR

[76] Inventor: Arthur E. Bishop, 54 Tobruk, Cremorne, New South Wales, Australia

[22] Filed: Aug. 16, 1971

[21] Appl. No.: 171,842

[30] Foreign Application Priority Data
Aug. 17, 1970  Australia............................ 2222/70
July 5, 1971  Australia............................ 3086/71

[52] U.S. Cl. ................................... 74/422, 74/498
[51] Int. Cl. ............................................ F16h 1/04
[58] Field of Search...................... 74/422, 507, 508, 74/498, 462

[56] References Cited
UNITED STATES PATENTS
3,064,491  11/1962  Bishop .............................. 74/422 X
3,661,032  5/1972  Jenvey ................................. 74/498
2,563,702  8/1951  Benford ........................... 74/422 X

*Primary Examiner*—Milton Kaufman
*Assistant Examiner*—Frank H. McKenzie, Jr.
*Attorney*—Carlton Hill, J. Arthur Gross et al.

[57] ABSTRACT

A variable ratio steering mechanism for a vehicle having an axially movable rack meshing with a helical pinion the axis thereof making an angle with the axis of the said rack, the rack having a group of teeth at its center of varying form and varying inclinations with respect to the axis of the rack, the inclination of the teeth of said group becoming less closely aligned with the pinion axis as the teeth are more remote from the center of said rack, said teeth thereby meshing with the teeth of the pinion at varying effective pitch radii in a predetermined manner.

14 Claims, 19 Drawing Figures

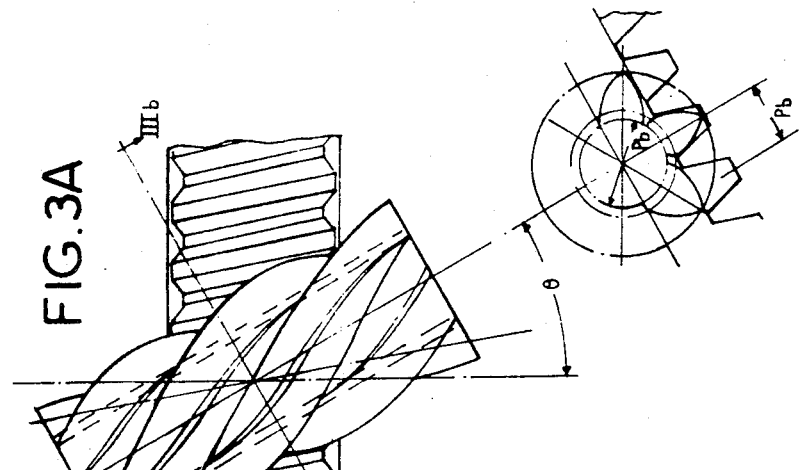
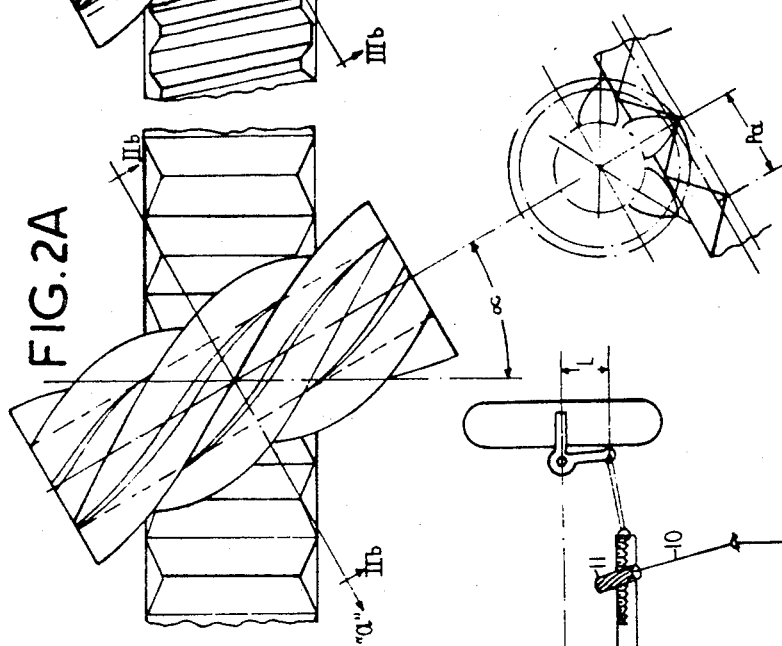
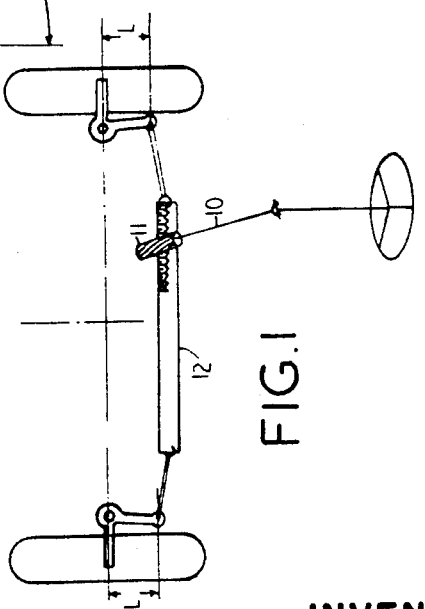
INVENTOR
Arthur E. Bishop

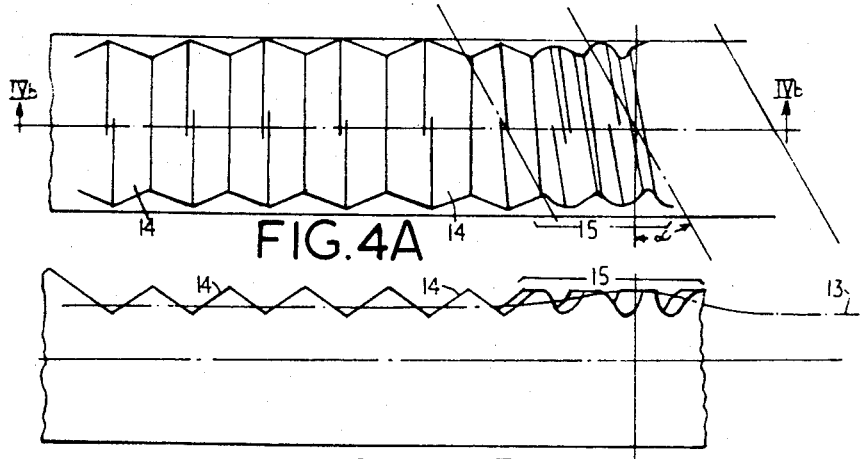
FIG.4A
FIG.4B
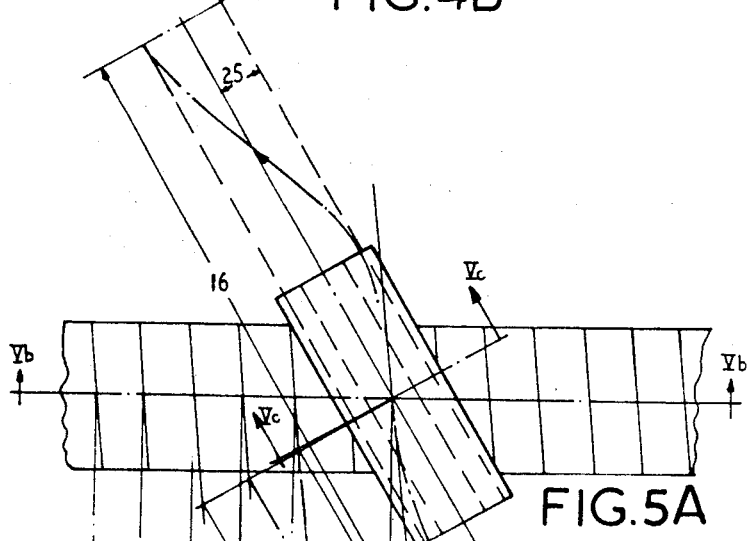
FIG.5A
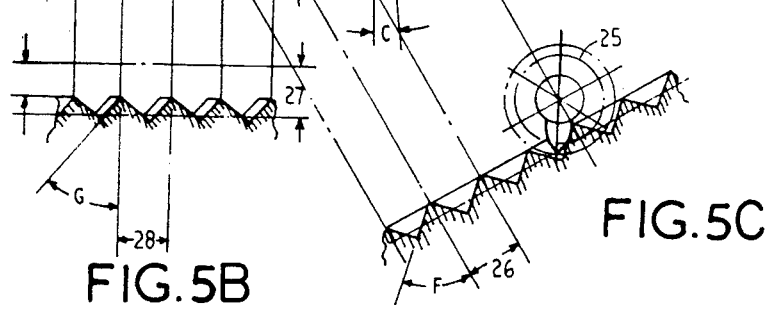
FIG.5B
FIG.5C
INVENTOR
Arthur E. Bishop

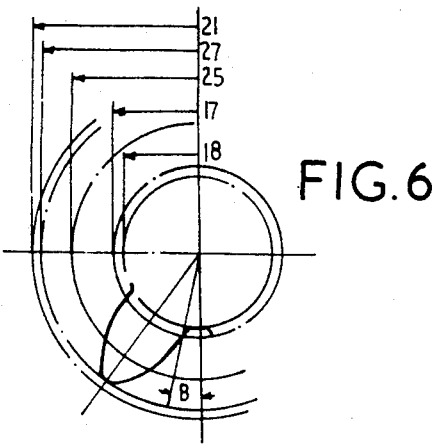
FIG.6
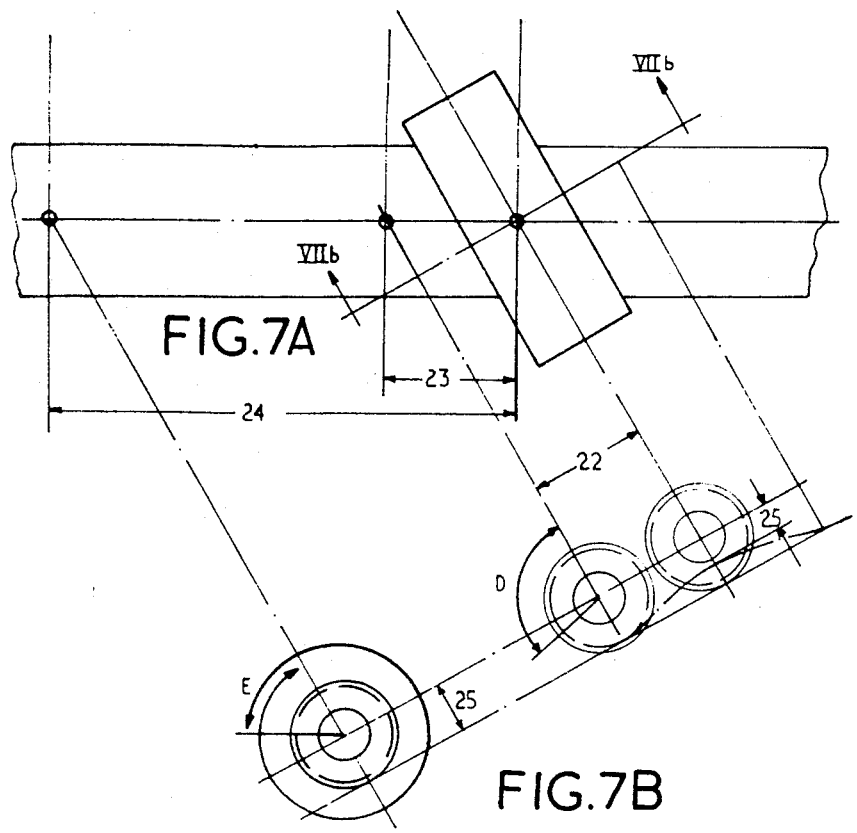
FIG.7A
FIG.7B

RACK AND PINION VARIABLE RATIO STEERING GEAR

BACKGROUND OF THE INVENTION

The present invention relates to a variable ratio steering mechanism of the rack and pinion type. The characteristics and advantages of rack and pinion steering are well known, as are the advantages of providing a variable steering ratio and it is therefore unnecessary to explain these in the present specification.

Considerable problems have however arisen in devising a practical construction which incorporates variable ratio steering in a mechanism of the rack and pinion type. One approach to a solution to the problem is disclosed in the specification of U.S. Pat. No. 2,865,339, in which a non-round, straight cut pinion engages a "wavy" rack, producing a varying ratio of engagement which recurs at each revolution of the pinion and hence also of the steering wheel. This necessarily requires that the wheels of the vehicle to be steered must be moved throughout their entire range of movement from lock to lock by not more than two turns of the steering wheel, and a very low average ratio results. As a high (numerical) ratio is needed near center to avoid excess sensitivity at speed, the change in ratio with this system is generally in excess of 2:1. This shortcoming can be overcome by the introduction of an intermediate gear between the steering wheel and the pinion to allow more turns of the steering wheel or by modifying the rack as described in U.S. Pat. No. 2,973,658. Such constructions however introduce complexities into the system which add undesirable expense.

In addition to directness of the steering action, it was found very difficult to achieve a smooth action in a steering mechanism of this kind in view of the sudden transitions in tooth action necessitated by the non-round form of the pinion and high pressure angles. A helical form of the device, which might well have cured this roughness, was obviously impractical.

A somewhat different approach to the solution of the general problem of providing a variable ratio steering mechanism of the rack and pinion type is described in U.S. Pat. No. 3,267,763 and the corresponding British Pat. No. 977,434. In that construction a concentrically mounted driving pinion of circular form is meshed with a rack having teeth of various forms. Teeth of minimum pitch and pressure angle providing a maximum ratio are provided at the center of the rack and teeth of maximum pitch and maximum pressure angle providing a minimum ratio are provided at the ends of the rack, the intervening teeth on each side of the center having a progressive variation of pitch and form. Note that the variation of pitch radius of the pinion in any case is a result solely of the forms of the rack teeth.

A detailed consideration of that form of mechanism has shown that, although it is not limited in the number of steering wheel turns, practical considerations so limit the amount of ratio variation and pattern thereof that little benefit has resulted from its use. In a typical passenger car steering gear employing power assist, optimum steering performance requires a variation of steering ratio of just less than 2:1, a rapid drop of ratio from the center, a "flare" out to a more constant ratio with about 2½ turns stop to stop. If such characteristics are sought to be obtained by employing the subject mechanism, the following difficulties are posed:

1. A very low pressure angle must be used for the form of the central, most frequently used, teeth to such a degree that considerable weakness in the strength of these teeth results.
2. A very high pressure angle must be used for the teeth at the ends of the rack in order to obtain the desired low ratio in this region, as a result there is a large variation of efficiency, successively, during the engagement of each tooth (as much as 30 percent). The requirement that the driver be able to steer the car in these low ratio regions when the power assist has failed governs how low the ratio may be in this region. Intermittently occurring regions of poor efficiency, such as would occur with this system, obviously impose a limitation in selecting the low ratio.
3. A rapid ratio drop, or change of pressure angle, particularly occurring in the high ratio, low pressure angle region, produces "holes" or cusps in the rack tooth flanks at certain points, and the intensity of surface loading at these points becomes unacceptable. Even if this is avoided by reducing the rate of ratio change to less than that desired, areas of very small radius occur on the rack tooth profiles, which will be points of high wear rate.

The first of the difficulties mentioned above is appreciated in the prior specifications referred to in that it is proposed that in order to increase the strength of the teeth, an intermediate reduction pinion be provided between the steering mechanism and the pinion meshed with the rack. However, as has been pointed out above, this is an expensive solution.

The object of the present invention is to provide a variable ratio steering mechanism of the rack and pinion type, the design of which overcomes these listed difficulties.

SUMMARY OF THE INVENTION

Whereas in the prior proposals the pinions used are of the straight cut variety, it is proposed in the present invention to use a substantially concentrically mounted helical pinion the teeth of which are substantially identical in shape meshing with a rack having teeth some at least of which are such as to provide a variable steering ratio, it being preferred that the majority of the teeth of the rack provide a low steering ratio and be of constant section across their width, a small group only of teeth at the center of the rack being of warped configuration to provide, in cooperation with the helical pinion, a change of steering ratio from a high ratio to the low ratio.

The use of a helical pinion permits the variation of the steering ratio by as much as two to one and whereas a non-helical pinion under these circumstances would give discontinuous tooth action in the low ratio region at either end of the rack and would result in poor strength of the teeth in the high ratio region, by the use of a helical pinion it is possible to design the teeth at the center of the rack so as to have adequate strength. Although this results in the use of a pressure angle in the teeth towards the ends of the rack of about 60°, an angle which would be entirely unacceptable for a straight cut pinion, this is acceptable here, due to the fact that the resulting discontinuous tooth action can be accommodated by a helical pinion, since tooth engagement is staggered across the width of the rack.

If the helical pinion fails to span the coarse low ratio teeth of the rack for some parts of its rotation this will occur only in one part of the width of the rack and full engagement will occur across the remainder of the width. Furthermore, tooth engagement being staggered across the width of the rack compensates for the variations of efficiency in rack tooth action.

While the use of a helical pinion has the advantages referred to above, its use does present some problems in manufacture of the rack.

An examination of the problems has, however, shown that teeth of suitable form can be generated, for example, by the use of a cutter which is an identical facsimile of the pinion, a technique well known in the manufacture of geared pairs. The difficulties and expense of the method can be considerably reduced by designing the rack so that the majority of its teeth can be formed by a straightforward broaching process, only a small number of teeth near the middle of the rack having to be generated. The design may be such that it is possible to broach teeth of the form used at the ends of the rack over the whole length of the rack and thereafter modify the teeth at the center of the rack to the required form, broaching of the central teeth would, of course, be to only a relatively shallow depth. This reduces the use of the more elaborate generating technique required for these teeth to a minimum.

In order that the invention may be better understood and put into practice a preferred form thereof is hereinafter described, by way of example, with reference to the accompanying drawings in which:

DESCRIPTION OF THE DRAWINGS

FIG. 1 is a diagrammatic view of a rack and pinion steering mechanism;

FIG. 2A is a scrap view in plan of a helical pinion engaging teeth in a low ratio region of a rack;

FIG. 2B is a sectional view on the line IIb—IIb;

FIG. 3A is a view similar to FIG. 2A showing the pinion engaging teeth in a high ratio region of a rack, here in a non-varying ratio form;

FIG. 3B is a section on line IIIb—IIIb of FIG. 3A;

FIG. 4A is a plan view of one half of a rack having low ratio teeth over the majority of its length and a small group of variable ratio teeth at the center, FIG. 4B is a section on IVb—IVb of FIG. 4A;

FIG. 5A illustrates diagrammatically the general case of a helical pinion arranged in engagement with a rack to illustrate pinion and mounting dimensions without reference to ratio variation;

FIG. 5B is a sectional view on line Vb—Vb of a part of FIG. 5A;

FIG. 5C is a section on Vc—Vc of FIG. 5A;

FIG. 6 is an enlarged view of the section shown in FIG. 5C;

FIG. 7A is a diagram similar to FIG. 5A, but illustrating the effect of ratio variation as distinct from the constant ratio of FIG. 5;

FIG. 7B is a diagrammatic view on line VIIb—VIIb of FIG. 7A;

DETAILED DESCRIPTION

Figure 8:
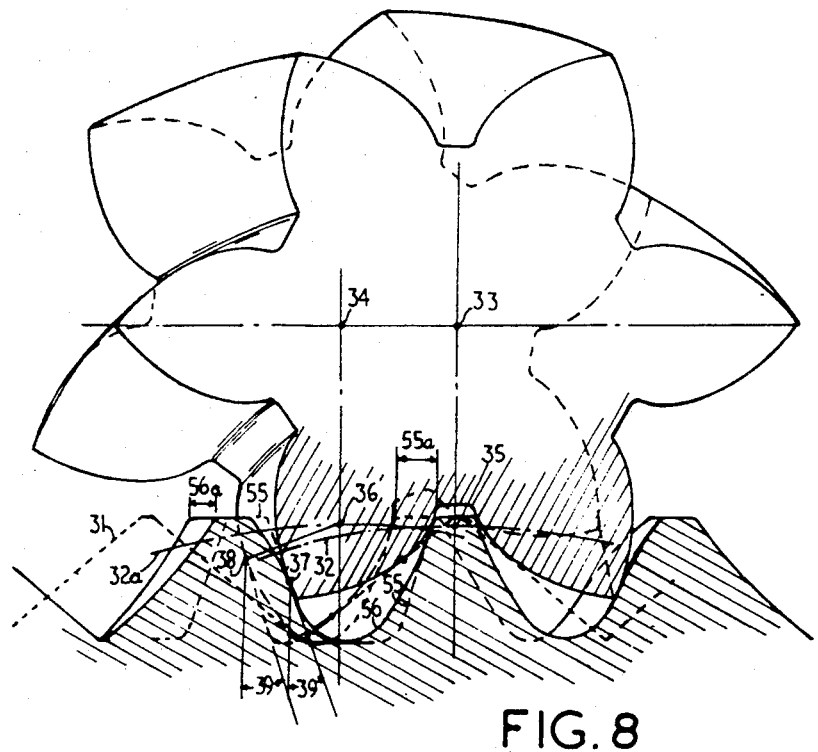
FIG. 8 is a sectional view to a very much enlarged scale of the rack and pinion of FIG. 5a showing the particular features of contact between the rack and the pinion being a section through the centerline of the rack.

Before describing a particular form of the invention a number of factors connected with the design of rack and pinion steering mechanisms will be discussed to assit in an understanding of the invention.

A number of variables are available to the designer of rack and pinion steering, but in practice, considerations of economy, strength, and performance narrow the choice.

The space available for the steering gear being limited, it generally happens that the steering shaft 10 (FIG. 1) and hence the steering pinion 11, must be angled in the plan view outward from the car centerline at from 20° to 30°. The stroke of the rack 12 is also limited by suspension geometry and, as the minimum number of wheel turns is set by considerations of sensitivity at high speeds, steering pinions are generally just as small in diameter as safety allows.

It should be made clear at this juncture that, although in FIG. 1 no indication is given of the use of power assistance, the present invention is equally applicable to either power assisted or manual steering mechanisms.

The angular arrangement of the pinion in the plan view may be exploited to increase the pinion in size as indicated in FIG. 2A, which is a scrap view in plan of the pinion and rack of a right-hand drive vehicle, with the steering gear located behind the wheels (as illustrated in FIG. 1). Here the teeth are arranged transversely across the rack, and a left-hand spiral pinion is used of a helix angle just matching the installed angle of the pinion ($\alpha$). Because motion of the pinion teeth lie along the line $a$ whereas the rack tooth surfaces lie square to the rack axis, "slippage" occurs, so that one tooth of the pinion of pitch $p$ in the normal plane drives the rack only the lesser distance $p \cos \alpha$, and hence a somewhat larger pinion may be used than if a non-helical non-inclined pinion were used. If on the other hand the pinion spiral angle were reduced so that the rack teeth lay more nearly along the installed angle axis of the pinion $\alpha$, the "slippage" effect would be lost and the pinion diameter would have to be reduced in order to keep the same desired pitch diameter.

Now consider the implications of introducing a variable ratio into the helical rack and pinion steering gear. FIGS. 2A and 2B illustrate a low ratio region where the pitch radius of the pinion lies almost at the tips of the teeth. Now in a variable ratio gear the ratio in this area may, in fact, be quite low so that the pitch diameter is relatively large. However, because this pitch diameter is almost equal to the outside diameter of the pinion an undesirably small pinion will still result unless every advantage is taken of the preferred arrangement of the helix as mentioned in the previous paragraph. Note that the teeth here are spaced relatively far apart as at Pa. If the same pinion is now meshed with another rack or another section of the same rack at a very small pitch diameter on the pinion, as illustrated in FIGS. 3A and 3B, the teeth will now be spaced close together as at Pb and it will be seen that the teeth of the rack are now slanted to more nearly match the axis of the pinion. This follows as a corollary of the statement at the end of the last paragraph and because of this, some of the ratio change that would have resulted from the reduced pitch has now been lost.

The above description illustrates a feature of steering racks made according to this invention, namely that the teeth of the rack typically in one area are arranged at one angle to the rack centerline and have one pressure angle, and at another point are angled at another angle to the rack centerline and have another pressure angle. Such an arrangement is believed to be novel both in the art of steering racks and, indeed in gearing of any sort.

Whereas the rack thus is highly unusual, the pinion appears superficially somewhat conventional. However, the optimum proportions in any given design of steering mechanism require that the pinion be highly modified from conventional steering mechanism practice. This is because of the great range of pressure angles over which the pinion is required to mesh if a desirably large change of ratio is used. Much more of the involute curve is used than conventionally, to achieve which the gap at the root of the pinion teeth is made narrow, and at the tips the teeth are brought virtually to a sharp point. Thus in the case of the figures given as an example, relating to a pinion of six teeth, the angle subtended at the center by any involute flank is 22½°, while a conventional seven tooth pinion of a constant ratio version of the same steering gear would use only 10°. Note that the proportions of this seven tooth pinion are already highly modified as compared to conventional gearing, but in a manner well known in the art of steering mechanisms.

Such unconventional pinion teeth, if used in a constant ratio, steering mechanism would result in impractical rack tooth forms as illustrated by line 55 of FIG. 8 (as discussed below). However, the proper strength balance between rack and pinion teeth in a variable ratio gear of the type desired is achievable only by using such pinions.

The unconventional form of the pinion teeth is most readily defined by considering the proportions of the generating radii of a conventional pressure angle (say 20°) rack with which it would mesh. FIG. 8 which relates to the matter of strength, will serve to show, at line 55, the proportions of such a hypothetical constant ratio rack. Now conventional racks are proportional with respect to a plane of symmetry 55b, generally the mid height of the teeth, in which plane the gap between adjacent rack teeth conventionally equal the tooth thickness. For the figures given by way of example of the present invention, the pinion is defined by a 20° pressure angle generating rack having a tooth gap more than double the tooth thickness.

FIGS. 4A and 4B show how a rack according to the invention might appear, with the rack pitch plane 13, for most of its length near the root of the coarse teeth 14 and hence near the tips of the pinion teeth (not shown) but humping up through center to provide a reduced pitch radius of the pinion in this region. Note that the rack pitch plane is a warped surface in that its hump occurs further to the left in FIG. 4a towards the top of the figure than it does lower in the same view. This humping must follow the pinion inclination angle ($\alpha$) as the pinion must mesh at the same pitch radius all along its length at any instant.

Figure 11:
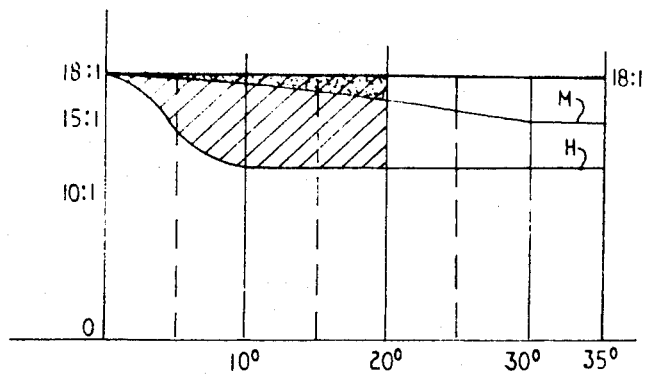
FIG. 11 is a diagram showing a comparison between ratio curves provided by a known form of rack and pinion steering and a rack and pinion steering mechanism according to the present invention.

It will be seen from FIGS. 4A and 4B that the rack has at its center a group of inclined teeth 15 of which the center tooth is at the greatest inclination, the inclination of subsequent teeth being successively less, terminating in the coarse, low ratio teeth 14 square to the axis, which continue thus to the end of the rack. The rack is of course symmetrical about its centerline in that right hand end (not shown) is identical with the left hand end shown, but rotated 100° about 'O'. This arrangement of teeth gives a variation in steering ratio which is illustrated at H in FIG. 11 and is discussed fully in connection with that figure. It should be noted that for rack and pinion steering the steering ratio is defined as the effective radius of the pinion divided by the average effective length of the steering arm L (see FIG. 1). The effective radius of the pinion will vary according to variations of the rack pitch plane 13 (FIG. 4B) and the effective length L according to the geometry of the steering mechanism of the particular vehicle to which the invention is applied.

The design details of one particular rack and pinion mechanism according to the invention are given below and these should be read in conjunction with FIGS. 5A to 7B, in which the various reference numerals and letters appear.

PINION AND MOUNTING DETAILS

| | | | |
|---|---|---|---|
| No. of Teeth: | 6 | Form | Involute |
| Helix: | Left Hand | Lead length (16) | 6.84029" |
| Base Circ. Diameter (17) | 0.531859 | Root Diameter (18) | 0.510" |
| | | Overall Diameter (21) | 0.875" |

Installed Angle ($\alpha$) 22°
Angle, center of tooth gap to start of involute (B) 6°
Assumed effective length of steering arms 4.92 inches

RATIO CURVE DETAILS

Form of curve (pinion normal plane) — Sinusoidal
Rack travel — centerline to constant — Low ratio value.
 (Pinion Normal Plane) (22) 0.800 inch
 (Rack Axis Plane) (23) 0.86280 inch
Rotation of Pinion, centerline to constant
 Low Ratio (D°) 147.7°
Total travel of rack, each side of centerline (24) 3.06 inches
Rotation of Pinion, centerline to end of travel (E) 1.267 turns
Ratio of center 18:1   Ratio-Low Ratio 12.07:1
Rotation of pinion, centerline to end of travel, if ratio constant at 18:1   1.782 turns

RACK DETAILS

| | Low Ratio Region | On Center Variable Ratio Section |
|---|---|---|
| PINION NORMAL PLANE | | |
| (Pressure Angle) | 52° 48' 2" | 18° |
| (Pinion Pitch Rad.) (25) | 0.43985" | 0.279615 |
| (Circular Pitch) (26) | 0.46061 | |
| RACK AXIS PLANE | | |
| (Pressure Angle) (G) | 50° 41' | 17° 36' 51" |
| (Pinion Pitch* Rad. (27) ) | 0.407822 | 0.273222 |
| (Circular Pitch* (28) ) | 0.427068 | |
| (* Effective in this Plane) | | |
| Pitch Helix Angle (C-A) | 22° | 13° 4' 43" |
| Rack Skew Angle (C) | 0° | 8° 55' 16" |

Figure 9:
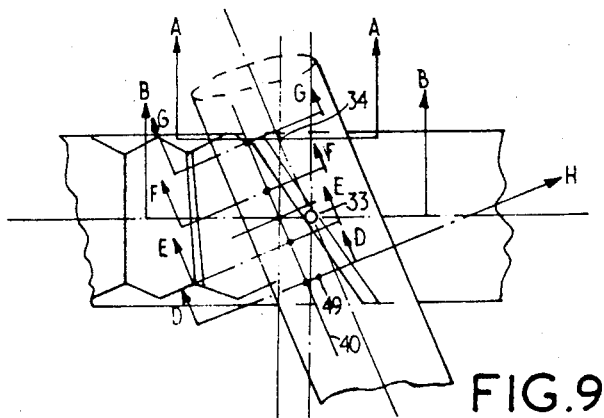
FIG. 9 is a plan view in diagrammatic form of the pinion and the rack showing the position of various section lines referred to in the description.
Figure 10:
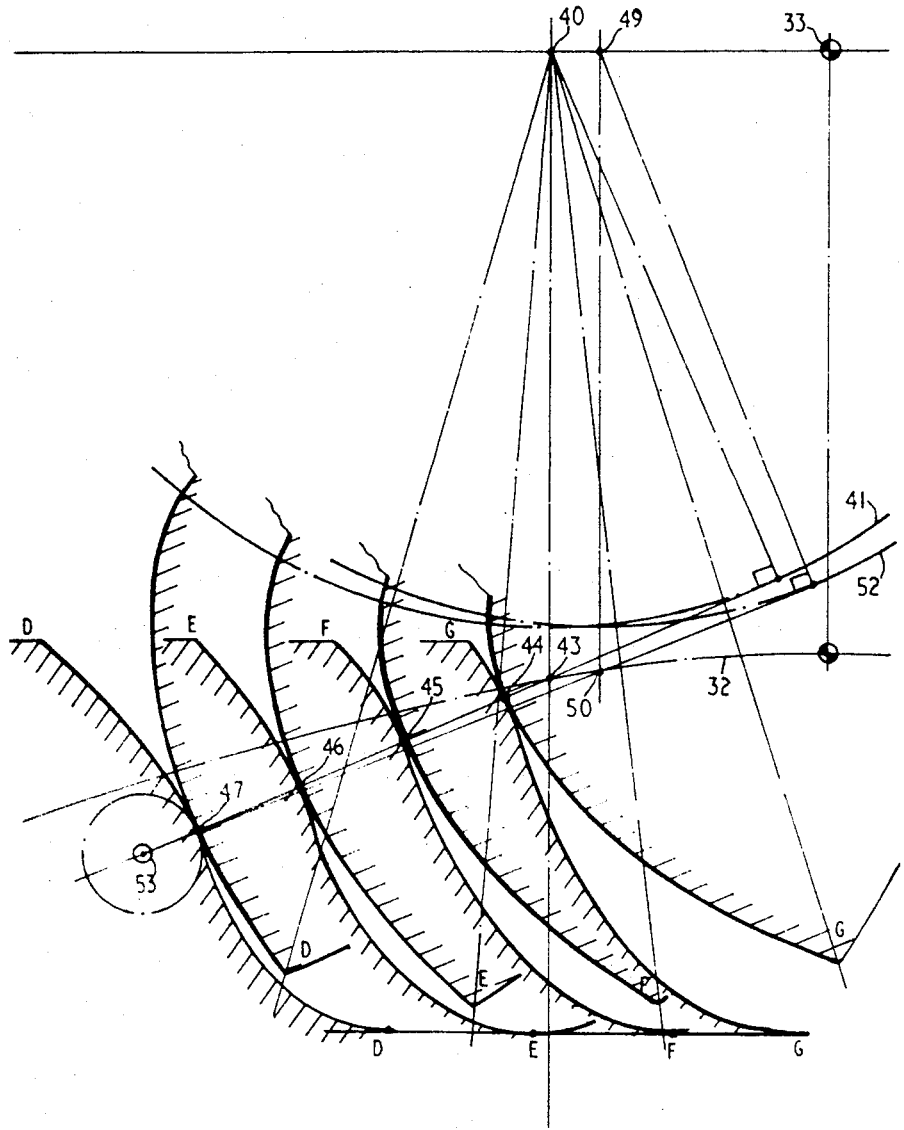
FIG. 10 is a diagram indicating the contact conditions in the true normal plane of the pinion of FIG. 8.

A clearer understanding of the invention may be gained from a consideration of FIGS. 8, 9 and 10 of which FIGS. 8 and 10 are enlarged scale drawings showing particular features of the contact between the variable ratio rack and six toothed helical pinion particulars of which are given above. FIG. 8 is a section through the centerline of the rack showing the pinion at an angle and hence appearing elliptical. The exact position of the parts as illustrated in FIG. 9 shows that the section is primarily that indicated as B—B and for the sake of clarity, in order to show the condition of engagement at the farthest side of the rack from the driver, the pinion has been imagined to but cut along line A—A of FIG. 9. The position shown in FIG. 9 is that in which the pinion is in the straight-ahead position otherwise known as "on-center"; the center of the pinion in the centerline section of the rack of FIG. 8 will be point 33 and the center of the pinion in the plane in which the pinion has been cut will be the point 34 in that same figure. The pitch line indicated at 32 in FIG. 8 will reach its maximum value in height corresponding to a minimum steering ratio at the "on center" position 33, in the centerline section of the rack at point 35. Now considering the section on plane A—A, the pitch line 32a will again be at its maximum value here and the intersection of the crest of the pitch line curve 32a and the centerline of the pinion will take place at point 36. The corresponding contact points in planes B and A respectively will be at points 37 and 38. Note that the lines joining 36 to 38 and 35 to 37 lie at the same angle to the vertical, which angle 39,39 is the pressure angle corresponding to the pitch radii (also identical) of the pinion in the two planes at that instant. These pitch radii are indicated by the length of the line 34-36 and also by the length of the line 33-35. This pressure angle 39 is of the order of 18° for the on-center position shown in that particular instant for the particular example chosen and increases from there to a value of about 52° in the low ratio region. Now whereas this view shows in general terms the contact conditions, it will be noted that the curves in this view are those on the slanted plane as far as the pinion is concerned and hence are not true involutes. In accordance with the normal technique of laying out gearing therefore, it is necessary to consider the contact conditions in the true normal plane of the pinion, which is done in FIG. 10. To do this a point is taken slightly displaced to the left on the centerline 40. In order to consider the different meshing conditions along the pinion axis, four sections are taken as at DD, EE, FF and GG of FIG. 9.

For the sake of clarity these are all superimposed on a common center indicated as point 40 in FIG. 10. Note that in this view the flanks of the pinion are true involute curves and hence several properties of the involute relating to the contact points may be illustrated in this section; thus if one sets out in this view, about center 40, the base circle 41 of the involute and then draws a line 42 tangent to this base circle through 43, being the pitch point of engagement between the pinion and rack at that instant, this line continued will pass through the contact point 44 between the rack and the pinion. As this construction is valid for each of the four sections noted, it will be seen that points 44, 45, 46 and 47 are in a straight line as the pitch radius is the same for each of these conditions of meshing; it follows that the pressure angle indicated as 48 will be the same in each case. Now in order to study the condition of contact at this instant it is the practice to take a small displacement of the pinion for example to 49, rolling either backwards or forwards along the plane. Note that in the case chosen, in plane D the pinion has been rolled along the line or in the direction of H (FIG. 9) in this plane and in so doing of course, the point 43 on the pitch line has been departed from a new intersection of the pinion centerline and the pitch line occurs at 50; as line 40-50 is shorter than line 40-43 the pressure angle has changed and the new value 51 is smaller than that indicated at 48. For this reason it follows that the line tangent to the base circle 52 passing through point 50 converges towards the former line tangent to the earlier base circle and meets it at a point such as at 53, however, it will follow that the instantaneous curvature or the average curvature occurring over the interval of movement 40-49 on each of the flanks is approximated by a circle having its center at 53 and it is obvious then that the radius of contact for each of the planes D, E, F and G will be indicated by the lengths 53-47, 53-46, 53-45, and 53-44. Also apparent is the fact that the radius at 47 is very small for the case sketched and would be quite unsuited to carry the loads imposed on a steering mechanism were it not for the fact that this occurs only in one of the four planes indicated and is backed up by much more advantageous conditions of contact in other sections. There are many factors which determine the magnitude of this radius such as the slope of the pitch line and the oreintation of the teeth with respect to the pitch line at any instant but it is important to note that in general in rack and pinion variable ratio steering it is impossible to construct a satisfactory pitch line in a practical arrangement that does not involve such very small radii at at least one section across the width of the teeth.

This is one of the great advantages of the helical rack and pinion in that conditions as in plane D could not be tolerated if they occurred across the whole width of the teeth as would be the case with a non-helical pinion.

Referring again to FIG. 8, the angular disposition of the rack teeth in the plan view associated with the small pitch radius is evident by the displacement of the section of the rack teeth in the centerline plane B-B as compared with the plane A—A. This displacement indicated as 55a in the on-center condition has reduced to the value shown as 56a at the first tooth and would reduce very rapidly to virtually zero at the third tooth. In the example chosen the low ratio teeth lie transversely across the rack, and there is of course no displacement of the teeth in section across the plane of the rack in FIG. 8. This is indicated by the single dotted line 31 and it will note noted that this single tooth profile is in fact tangent to the pinion both on the centerline plane A—A and in the remote plane, B—B.

As has been mentioned elsewhere there are distinct functional advantages in having the ratio drop rapidly as is made possible by the use of helical teeth. A second advantage is well illustrated in FIG. 8, this relates to the question of the strength of the teeth. If the ratio were substantially constant near the on-center condition where the pressure angle is relatively small (say 20° in this figure) the teeth would have relatively straight flanks as indicated at line 55. It will be noted that the strength of these teeth is considerably less than that given by the variable ratio form as indicated at 56 where the flaring out of the base of the tooth is attributable to the rapidly reducing ratio. This is even more apparent in the second tooth where if the ratio increased slowly as proposed by some other workers the second tooth would have the same narrow form indicated by line 55. In contrast to this the second tooth shows that the rack is very substantial indeed and contact occurring for example at 37 at the on-center position is backed by a tooth of equivalent strength to that of the pinion. In contrast to this a tooth of the general shape indicated by line 55 for this second tooth would have a strength only a fraction of that of the pinion and be quite incapable of carrying the load required in this on-center meshing condition. It will be realized that it is this condition where most loads are carried in the steering gear and hence it is very important that buttress type teeth shall be provided in this position.

The practical value of a rack and pinion steering mechanism of the construction described above is illustrated in FIG. 11 in which steering ratio as defined above is plotted against angle of turn of the front wheels of the vehicle taken as an average of right and left turns. In this the upper horizontal line may be taken as representing a standard type of steering having a constant steering ratio of 18:1. The line M illustrates the effect achieved with a variable ratio rack and pinion steering of the kind described in the United States and British patent specifications mentioned above. Taking a typical intersection turn angle as being 20°, the area between the upper line and curve M (shaded solid) represents to some scale the saving in terms of turns of the steering wheel as between a standard steering system and that described in those specifications and this amounts to about 5 percent.

The lower curve H represents the results achieved by a rack and pinion steering employing a helical pinion and constructed according to the present invention which gives under similar conditions a saving (represented by the hatched area) of about 25 percent, for the same angle of turn and, as has been shown above, this is achieved without suffering the disadvantages referred to at the beginning of the specification.

In the embodiment of the invention described above, the involute curve has been used, as it results in the simplest possible generation of the pinion and the least complex form for the broach teeth in the low constant ratio region of the rack. The many advantages of the involute, well known in the art of gearing, are not fully utilized however in this case; for example the insensitivity to change of center distances and the simplicity with which a family of gears may be made from the one cutter. The design parameters in rack and pinion steering are, however, so demanding that curves other than the involute may be used to advantage, even though at the penalty of some complexity in making the broach for the rack and in the generation of the pinion.

It will be found, for example, by departing from the use of a straight sided rack flank in the low ratio region, (particularly when pressure angles in excess of 50° are used) and substituting for example a concave tooth profile some considerable advantages result. The reason for this is that the limiting value for pressure angles is determined by the contact at the tips of the rack teeth, where the combination of high sliding velocity and steep pressure angle result in near-binding conditions. At the root of the rack teeth, however, sliding velocity reduces to almost zero and the pressure angle may be substantially higher, while still avoiding binding, than is possible at the tip of the teeth.

Figures 12, 13:
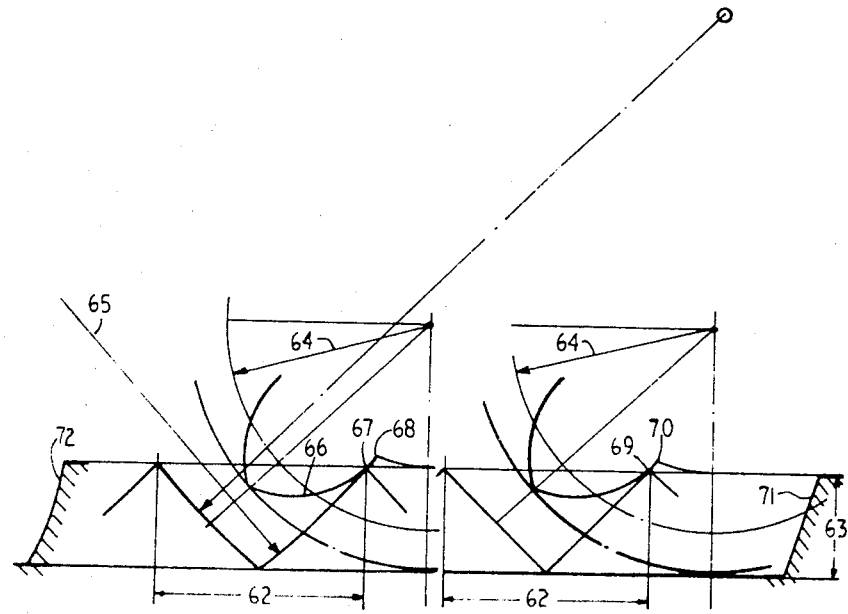
FIGS. 12 and 13 are diagrams illustrating considerations involved in the use of a pinion having non-involute teeth.

These advantages may be studied by considering FIGS. 12 and 13 in which two pinion rack combinations are compared meshed in the low ratio region having the same pitch 62, tooth height 63 and pitch radius 64 of the pinion. In FIG. 13 a straight flank is used for the rack as described previously, whereas in FIG. 12 the root and tip points have been maintained, but an arc centered at point 65 has been used to join these extremes. Note that, while accurate broach teeth will be somewhat more difficult to make to the required order of accuracy than straight-sided teeth, they would be greatly preferable to higher order or arbitrary curves. Typically, radius 65 might be five times the length of the rack flank. Note that certain complications have also been introduced in the system in the manufacture of the pinion.

Thus in FIG. 13 if a hob were used of the same form as the teeth, generation would cease at point 69. For this reason the hob must be used of the least pressure angle with which the pinion is required to mesh, in this case about 18° as shown by line 71. Because the pinion flank is an involute, however, line 71 is a straight line and thus the hob is of the simplest possible form. In the case of FIG. 12, it is again not possible to use a hob for the pinion of the same profile as the rack as the form of the pinion between 67 and 68 would not be determined. A suitable hob profile, such as shown by line 72, may be determined of generally less slope than that of the rack flank, but this will not be a radius nor indeed any simple shape.

In the case of the pinion required to mesh with the arcuate form rack, however, a lower pressure angle hob must be employed whose teeth will be of some arbitrary form.

Therefore, the following steps must be observed in completing the design of a hollow rack form variable ratio pinion as illustrated in FIG. 12. Step 1. Determine the optimum form of the rack tooth flank, to meet the performance parameters of the steering gear, preferably a simple radius or combination of radius and straight line, for the purpose of simplicity in making the broach. Step 2. Determine the conjugate form of the pinion flank 66 up to a point 67, rolling the pinion at a constant pitch radius. Step 3. The pitch flank in an arbitrary manner between points 67 and 68 having regard to the required ratio in the low ratio region and the form of ratio variation. Taking the pinion flank so derived, roll this at a predetermined generating pitch radius and so determine the counterpart form of the generating hob which must be used to manufacture the pinion, making due allowance for the effects of the helical form of the pinion.

Naturally, the generating pitch radius will be of the order of the smallest pitch radius which the pinion is subsequently required to roll with the actual rack. This procedure for determining the form of hobs to manufacture arbitrary geared shapes is well known in the art of gearing and presents no undue problems to those skilled in the art.

While the embodiment of the invention described above relates to a variable ratio steering mechanism in which the steering ratio varies from a high ratio at the center to a constant ratio extending over the major part of the rack, other configurations may be adopted, for example, the effective pitch radius (that is to say the radius which accounts for the lateral movement of the rack for a given angle of pinion rotation) of engagement with the pinion and thus the steering ratio may be caused to increase at the extreme ends of the rack by shaping the teeth of the rack in an appropriate manner. Such a configuration should be of value in some types of manually operated steering mechanism to assist in turning the wheels at extreme positions of lock.

I claim as my invention:

1. A variable ratio rack and pinion steering mechanism having an axially movable rack meshing with a helical pinion the axis of which makes an angle with the axis of the rack, the rack being characterized by having a group of teeth at its center said teeth being of varying forms and varying inclinations with respect to the axis of the rack, the inclination of the teeth of said group nearest the center being the most closely aligned with the axis of the pinion, the inclination of teeth of said group becoming less closely aligned with the pinion axis and more closely perpendicular to the axis of the rack as they move away from the center of the rack, the inclinations and forms of said group of teeth being associated with engagement of the said teeth with the pinion at varying effective pitch radii, the effective pitch radius being least at the center of the rack and increasing on either side thereof.

2. A variable ratio rack and pinion steering mechanism as claimed in claim 1, wherein the remainder of the teeth of the rack engage the pinion at an effective pitch radius substantially equal to the effective pitch radius at which the pinion is engaged by the outermost portions of the outer teeth of said group of teeth, said remainder of the teeth extending substantially at right angles to the axis of the rack.

3. A variable ratio rack and pinion steering mechanism as claimed in claim 2, wherein the sides of the remainder of the teeth of the rack are arcs of circles.

4. A variable ratio rack and pinion steering mechanism as claimed in claim 3, wherein the form of the teeth of the pinion is substantially involute.

5. A variable ratio rack and pinion steering mechanism as claimed in claim 2, wherein the form of the teeth of the pinion is substantially involute.

6. A variable ratio rack and pinion steering mechanism as claimed in claim 3, wherein the effective pitch radius increases symmetrically on either side of the center of the rack.

7. A variable ratio rack and pinion steering mechanism as claimed in claim 2, wherein the effective pitch radius increases symmetrically on either side of the center of the rack.

8. A variable ratio rack and pinion steering mechanism as claimed in claim 1, wherein the said group of teeth com-prise a minority of the teeth of the rack, the majority of teeth being straight sided and of constant section across the width of the rack whereby they are adapted to manufacture by broaching.

9. A variable ratio rack and pinion steering mechanism as claimed in claim 8, wherein the form of the teeth of the pinion is substantially involute.

10. A variable ratio rack and pinion steering mechanism as claimed in claim 8, wherein the effective pitch radius increases symmetrically on either side of the center of the rack.

11. A variable ratio rack and pinion steering mechanism as claimed in claim 1, wherein the form of the teeth of the pinion is substantially involute.

12. A variable ratio rack and pinion steering mechanism as claimed in claim 1, wherein the effective pitch radius increases symmetrically on either side of the center of the rack.

13. A variable ratio rack and pinion steering mechanism having an axially movable rack meshing with a helical pinion the axis of which makes an angle to the axis of the rack, the rack being characterized by having a group of teeth at its center whose form is different at every section across the width of the rack, and having other teeth each side of said group having a constant form at every section across the width of the rack, said group of teeth providing a varying effective pitch radius, and said other teeth providing a substantially constant effective pitch radius, said constant pitch radius being always greater than the varying effective pitch radius.

14. In a variable ratio rack and pinion steering mechanism as claimed in claim 1, a pinion having a form determined by a generating rack having a tooth space, measured at the mid height of the tooth, more than twice the tooth thickness.

* * * * *